W. C. CARR.
TRUCK.
APPLICATION FILED APR. 24, 1912.
1,062,887.
Patented May 27, 1913.
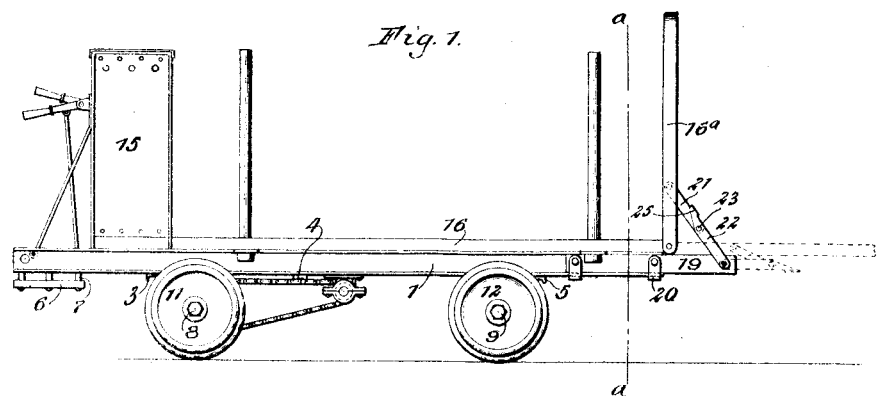
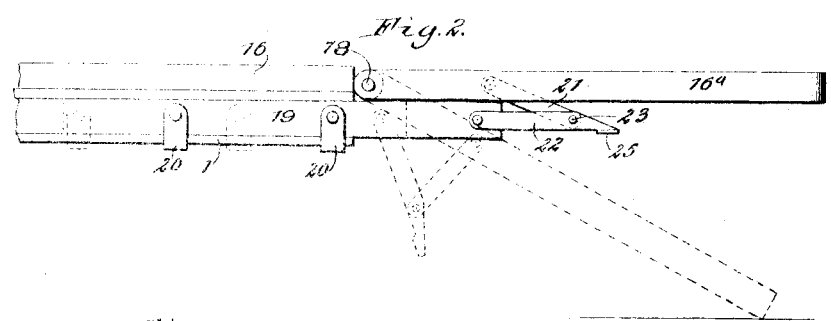
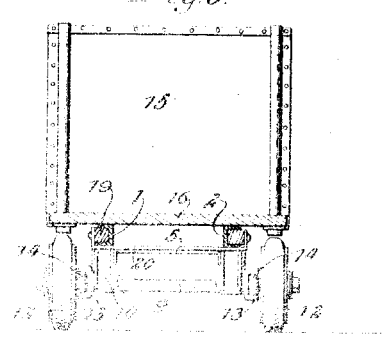
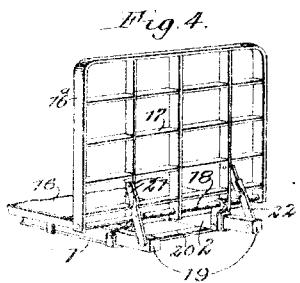
Witnesses:
D. H. Harper
James Sangster
Wm C. Carr  Inventor
By A. J. Sangster Attorney

UNITED STATES PATENT OFFICE.

WILLIAM C. CARR, OF BUFFALO, NEW YORK.

TRUCK.

1,062,887.  Specification of Letters Patent.  Patented May 27, 1913.

Application filed April 24, 1912.  Serial No. 692,817.

*To all whom it may concern:*

Be it known that I, WILLIAM C. CARR, a citizen of the United States, residing at Buffalo, in the county of Erie and State of New York, have invented a certain new and useful Improvement in Trucks, of which the following is a specification.

This invention relates to improvements in trucks and primarily to an end extension gate or member which is pivoted to the end of the truck platform and may be turned to any one of three positions,—a vertical position to constitute an end gate for the truck, a horizontal position to form a prolongation of the truck platform and thus increase the supporting surface of said platform, and a diagonal position with its lower end resting on the ground or floor and constituting an inclined skid for loading and unloading the truck platform.

Another feature relates to a slidable member which is supported in slideways in the end of the frame of the truck platform and to which pivotally jointed sectional supporting arms are pivoted at their lower ends.

The principal object of the invention is to provide a simple, strong and quickly operated extensible platform for trucks which may be placed in any one of three positions.

The invention also relates to certain details of construction which will be hereafter described, reference being had to the accompanying drawings in which,—

Figure 1 represents a side elevation of the improved truck showing the end extension gate or member in vertical position in full lines, and in a horizontal position in dotted lines. Fig. 2 is an enlarged fragmentary side elevation of the improved truck with the end extension gate or member in its horizontal position in full lines and in its diagonal position in dotted lines. Fig. 3 represents a transverse section on line *a—a* Fig. 1 through the truck to illustrate the slidable member. Fig. 4 is a rear perspective view of my invention.

In referring to the drawings in detail, like numerals designate like parts.

The main frame of this improved truck preferably consists of two longitudinal channel iron side beams 1 and 2, and a series of transverse beams which extend between and connect the longitudinal side beams and comprise an end beam 3, an intermediate beam 4, and an end beam 5. Besides these connecting transverse beams, a fairly wide, flat support 6 is extended transversely across between the ends of the longitudinal beams, being secured thereto by bolts or other fasteners 7, as shown in Fig. 1. This fairly wide, flat transversely extending support is located at the front end of the truck frame and forms a support at this end of the truck upon which the operator stands.

Two axles, 8 and 9, are supported in depending boxes 10 attached to the longitudinal beams. The axles 8 and 9 are of a stationary character and have their outer ends projecting beyond the longitudinal side beams. Supporting wheels are rotatably mounted on the outer projecting ends of the axles and are four in number. Two of the supporting wheels are driven from the motor and constitute the propelling wheels of the truck, while the other two rotate freely and are so constructed that they may be turned to steer the truck.

The propelling pair of wheels are indicated on the accompanying drawings by the numeral 11 and the free-running steering wheels by the numeral 12. In order that the steering wheels may be turned to steer the truck, the outer portions 13 of the axles 9 are pivotally connected to the inner portions by pivotal joints 14.

A box or compartment 15 for containing a storage battery is located at one end of the truck and extends transversely across the end thereof. A floor or platform 16 which is preferably constructed of wood is arranged in removable sections upon the truck frame. A folding end gate or extension is arranged at the end of the truck opposite the box 15 and is adapted to be turned up into vertical position, as shown in full lines in Fig. 1, down in horizontal position, as shown in full lines in Fig. 2 to constitute a longitudinal prolongation of the truck platform, or down in an inclined position to form a skid for loading or unloading the truck. The folding end gate is composed of longitudinal members 16ª and transverse members 17. The lower ends of the longitudinal side members 16ª are pivoted to the main truck frame by a long transverse bar or pivot pin 18. A slidable member is slidably mounted in the channels of the longitudinal side beams and is composed of two longitudinal side bars 19 and transverse connecting bars 20.

The end gate is supported in its vertical position by connecting bars which are each composed of two pivotally jointed sections 21 and 22, the upper end of the upper section of each connecting bar being pivoted to an intermediate portion of the end gate as shown in Fig. 4. The lower end of the lower section of each bar is pivoted to the rear end of one of the side bars 19 of the slidable member.

When the end gate is in vertical position the sections of the connecting bars extend in longitudinal alinement and diagonally downward and outward from the end gate to the end of the slidable member as shown in Figs. 1 and 4. The slidable member is also in its projecting position, being extended to the limit of its outward movement. The end gate is moved to a horizontal position by bending the sections of the connecting bars upward on their connecting pivot 23, turning them to an angle with each other and at the same time swinging the end gate downward. When it is desired to move the end gate to its lowest or diagonal position the slidable member is slid inwardly in the channels of the longitudinal side beams 1 thereby permitting the outer end of the end gate to drop downward into contact with the ground.

To limit the downward pivotal turning or opening movement of the sections 21 and 22, a lip 25 is extended laterally from the side of one of the lower sections which is adapted to project over the side and lock against the side edge of the upper section when the two sections are alined in their diagonal position to support the end gate in its vertical position.

The slidable member projects beneath and supports the end gate in its horizontal position, serves as the support for the lower ends of the sectional bars for locking the end gate in vertical position, and owing to its slidable character is adapted to be moved within the frame of the truck platform to permit the end gate to drop diagonally downward with its lower end resting upon the ground.

I claim:—

1. In a device of the class described, the combination with a truck platform, of an extension member attached to said platform and adapted to be turned to a vertical position to form an end gate for said platform, to a horizontal position to lengthen the platform, or to a diagonally inclined position to constitute a loading and unloading skid, means for locking the extension member in its vertical position, and means for supporting the extension member in its horizontal position; said supporting means being movable horizontally to permit the extension member to be turned down to a diagonally inclined position.

2. In a device of the class described, the combination with a truck platform having a frame including channel iron side beams, of a supporting member slidably mounted in the channels of the side beams, and an extension member pivoted to the end of the frame of the truck platform and adapted to be turned to either a vertical position, a horizontal position, or a diagonally inclined position; said supporting member when in one position being adapted to support the extension member in horizontal position and in another position to permit the extension member to drop to an inclined position with its outer end resting on the floor.

3. In a device of the class described, the combination with a truck platform, of an extension member attached to said platform, and adapted to be turned to a vertical position to form an end gate for said platform, to a horizontal position to lengthen the platform, or to a diagonally inclined position to constitute a loading and unloading skid, means for supporting the extension member in its horizontal position, and means for locking the extension member in its vertical position consisting of a supporting arm in pivotally jointed sections having one section pivoted to the supporting means, and another section pivoted to the extension member.

4. In a device of the class described, the combination with a truck platform, of an extension member pivoted to one end of said truck platform and adapted to be turned to either a vertical position, a horizontal position or a diagonally inclined position and a member for supporting the extension member in horizontal position slidably mounted in the truck platform and adapted to be moved inwardly to permit the extension member to drop to a diagonally inclined position and means for locking the extension member in vertical position connected to the extension member and the slidable member.

5. In a device of the class described, the combination with a truck platform, of an extension member pivoted to one end of said truck platform and adapted to be turned to either a vertical position, a horizontal position or a diagonally inclined position and a member for supporting the extension member in horizontal position slidably mounted in the truck platform and adapted to be moved inwardly to permit the extension member to drop to a diagonally inclined position and means for locking the extension member in vertical position pivotally connected to the extension member and the slidable member.

6. In a device of the class described, the combination with a truck platform having a frame including channel iron side beams, a member slidably mounted in the channels of the side beams and an extension member pivoted to the end of the frame of the truck platform and adapted to rest upon and be supported by the slidable member when in horizontal position and pivotally jointed sectional connecting bars attached at their respective ends to the slidable member and the extension member.

WILLIAM C. CARR.

Witnesses:
EDGAR L. KLEINDINST,
D. H. HARPER.